March 6, 1956
M. M. BEAN
2,736,924
BLADED TIRE MOLDS AND METHOD
Filed Oct. 1, 1953
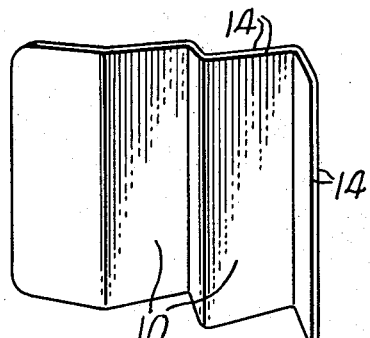
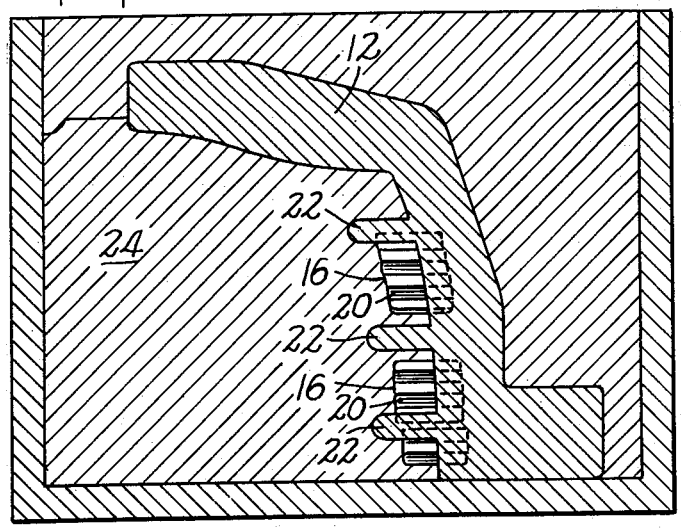
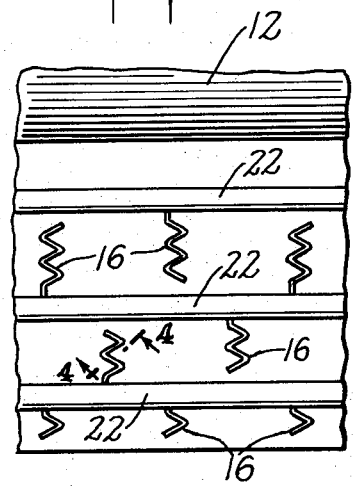
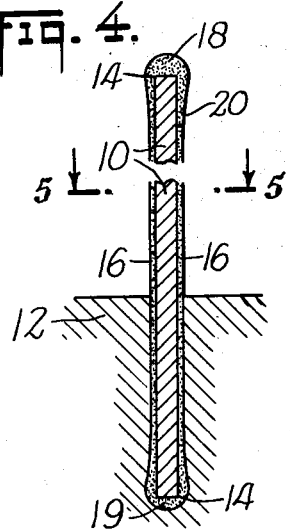
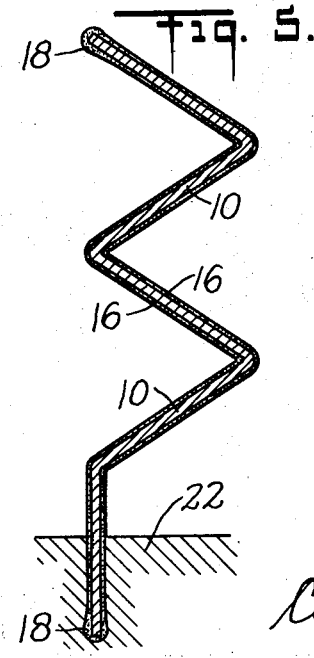
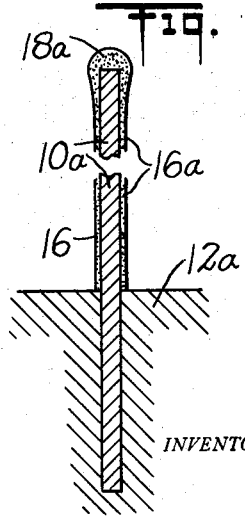
INVENTOR.
Morris Bean
BY Curtis, Morris & Safford
ATTORNEYS

United States Patent Office 2,736,924
Patented Mar. 6, 1956

2,736,924

BLADED TIRE MOLDS AND METHOD

Morris M. Bean, Yellow Springs, Ohio, assignor to Morris Bean & Company, Yellow Springs, Ohio, a corporation of Ohio Application October 1, 1953, Serial No. 383,501

3 Claims. (Cl. 18—44)

This invention relates to the making of molds and more particularly to the making of castings for forming the tread portion of pneumatic tires.

For some years now it has been known that the so-called "squeegee" tread for automobile tires has provided superior surface gripping characteristics over other types of tread. This tread consists essentially of a series of small, closely spaced slits in the surface of the tread such that the narrow contiguous projections therebetween bend under tractive force one against the other to wipe off the lubricating film of water from the tractive surface so that the next succeeding portion of the tread can obtain a better hold thereon. Various methods have been proposed for accomplishing this, including the cutting or slitting of the formed tread. Patent 2,263,001 to Gunsaulus and Bean shows the forming of slits during the molding process by the use of preformed blades in the tread mold.

Such cut or slit treads have sometimes shown a tendency to tearing during removal from molds or during service after the most careful inspection.

According to the present invention, the edges of the blades or inserts in the tread mold, are modified by enlarging and rounding. This is best achieved by plating the blades, prior or subsequent to their insertion in the mold, with a layer of metal, advantageously nickel, sufficient to blunt their angular sharp edges.

Although I shall now give a specific example of my invention as shown in the accompanying drawings and although I refer herein to certain specific preferences, recommendations and alternatives, it is to be understood that these are not exhaustive or limiting of the invention but are illustrative and for the purpose of instructing others in the principles of the invention and the manner of its use to the end that they may be enabled not only to use it in the particular embodiment shown but to so modify it and adapt it to various needs and conditions of use as to make the invention fully available to the public after the term of this patent has run its full course.

In the drawings:

Figure 1 is a perspective view of a blade of a type which has heretofore caused tread failures, but plated according to the present invention;

Figure 2 is a transverse sectional view of an assembled mold and cope after the casting metal has been poured therein showing the positioning of the plated blades within the tread mold casting;

Figure 3 is a plan view of a portion of the tread forming area of the casting of Figure 2;

Figure 4 is a sectional view on an enlarged and exaggerated scale on the line 4—4 of Figure 3 showing details of the plated blade and its insertion in the casting;

Figure 5 is a sectional view on line 5—5 of Figure 4 showing further details of the embedding and plating;

Figure 6 is a view similar to Figure 5 of another embodiment of the present invention.

Referring now to Figure 1, there is shown a blade of the type having a corrugated or zigzag transverse-sectional contour which is adapted to be embedded in the tread casting 12, Figure 2, to form squeegee slits in the tire tread upon molding thereof. The blades 10 may be positioned in any desired configuration, such as shown in Figure 3, to produce a suitable pattern.

As shown, these blades are stamped out of sheet metal and, according to the present invention, the sharp edges 14 of the blades 10 are rounded so as to eliminate all angle vertices. This is advantageously done by plating the entire blades with a securely adherent layer of a metal capable of withstanding the mold service, e. g., nickel, chromium or the like.

As is well known in the plating art, the plated metal 16 may be built up along the edges 14 into a bulge or bead 18 or 19; and this I take advantage of or even exaggerate to give a configuration somewhat as shown in Figure 4.

The plated blades 10 may then be inserted in a plaster mold (I use "mold" broadly to include "pattern," "model" etc.). The form of the bead enables the mold material to grip it more securely.

The casting metal can be poured in the usual manner and it surrounds and anchors the bead 18 on the opposite edge. The resultant projecting edges 20 of the blades 10 in the finished mold casting 12 being rounded as shown at 18 in Figures 4 and 5, provide a smooth edge and tapered border which will leave a smoothly curved bottom in the slit in the rubber of the tire tread molded thereabout which, upon the stripping of the tire from the mold pulls away without concentration of stress which could tear the rubber at the bottom of the slit.

Figure 4 shows beads 18 and 19 on both the upper and lower edges of a blade 10 which serves to anchor the blade in the casting as well as to form the desired round bottom in the slit when the tire is molded. The lower enlargement 19 forms an anchor which is firmly embedded in the casting 12 so that the blade cannot be pulled out by any normal use. As shown in Fig. 5, the blades 10 are similarly anchored in the ribs 22 of the casting 12. When this is done the edges so embedded do not require the special treatment for rounding corners and removing projecting vertex portions, as they will not contact the molded rubber.

I may also insert the blades at an earlier stage, e. g., into a pattern mold or a model, and embed them in the casting mold or the pattern mold to be transferred eventually into the casting.

For the tread molds made according to the showing of Figs. 1–5, the beaded edge 18 is embedded in the plaster or other material of the casting mold 24, either before it is set or by forcing it into the set mold material, advantageously while it is still soft, or into pre-formed slots, e. g., as set forth in the Gunsaulus and Bean patent. Such slots should advantageously be slightly less in width than the thickness of the bead, so that the bead spreads the mold material elastically as it enters the slot and is gripped by the stressed material engaging the bead.

The blades may, however, be secured in the mold before plating and then plated in situ, as illustrated in Figure 6. To this end, the main portion of the casting 12a may be masked so that only blades 10a or only their outer portions are plated, the outer edge portions being rounded and enlarged as at 18a; or the entire mold face may be plated under conditions which build up a thicker bead on the edge, or with a subsequent electroplating or dip treatment to form the bead.

Although I have shown a mold in which a segmental tread-forming casting is shown, it will be understood that the castings may be made in full circle half molds and it will also be understood that any type or design of slotted tread may be produced according to this invention. Likewise the invention may be used for molds to make other types of slit articles, e. g. non-skid soles for deck shoes.

I claim:

1. A mold, for use in forming slit resilient articles, of the type having a plurality of thin blades therein embedded in said mold and projecting above its mold face, which is characterized by each blade being of sheet metal coated with a surface metal forming an enlarged rounded bead at least on the projecting portion thereof.

2. A tire vulcanizing mold including tread-forming sections each having a bottom face for molding a tread surface, a plurality of thin blades embedded in and projecting in a predetermined pattern from the surfaces of said tread-forming sections to form a number of small squeegee slits in the tire tread, which is characterized by a plating on said blades forming enlarged rounded edge portions on at least the exposed edges of said blades.

3. The method of making molds for slit articles of rubber or like materials which comprises making thin blade members having a fin portion of form and dimensions corresponding in reverse to the slits of said article, but extending on at least one dimension into a root portion, electroplating additional material on edge portions of said fin portions in strongly adherent relation thereto and of smoothly rounded contour until it has a radius of curvature throughout greater than about half the thickness of the adjacent fin portion, embedding said fin portions of said members in a pattern but leaving said root portions projecting therefrom, casting a mold material around said root portions whereby said members are anchored in the casting, and removing the pattern to expose the face of the mold and the fin portions projecting therefrom.

References Cited in the file of this patent

UNITED STATES PATENTS

| | | |
|---|---|---|
| 2,123,181 | Deputy | July 12, 1938 |
| 2,275,582 | Bull | Mar. 10, 1942 |
| 2,298,729 | Zimmerman | Oct. 13, 1942 |
| 2,593,547 | Duerksen | Apr. 22, 1952 |